(12) United States Patent
Takai et al.

(10) Patent No.: US 9,130,496 B2
(45) Date of Patent: Sep. 8, 2015

(54) DRIVE SIGNAL GENERATING CIRCUIT

(75) Inventors: Kazumasa Takai, Gifu-ken (JP);
Hiroyuki Morihara, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 362 days.

(21) Appl. No.: 13/594,396

(22) Filed: Aug. 24, 2012

(65) Prior Publication Data

US 2013/0049655 A1 Feb. 28, 2013

(30) Foreign Application Priority Data

Aug. 25, 2011 (JP) ................................. 2011-183558

(51) Int. Cl.
| | |
|---|---|
| H02P 21/00 | (2006.01) |
| H02P 6/00 | (2006.01) |
| H02P 27/08 | (2006.01) |
| H02P 25/02 | (2006.01) |
| H02P 27/06 | (2006.01) |

(52) U.S. Cl.
CPC ............ *H02P 21/0035* (2013.01); *H02P 27/06* (2013.01)

(58) Field of Classification Search
USPC ........................... 318/400.02, 400.04, 400.24
See application file for complete search history.

(56) References Cited

U.S. PATENT DOCUMENTS

| | | | | |
|---|---|---|---|---|
| 2002/0050011 | A1* | 5/2002 | Cho et al. ........................... | 8/159 |
| 2003/0015987 | A1* | 1/2003 | Cheong et al. ................. | 318/701 |
| 2006/0145652 | A1* | 7/2006 | Ta et al. ........................ | 318/807 |
| 2008/0111516 | A1* | 5/2008 | Inokuma ........................ | 318/799 |
| 2010/0052599 | A1* | 3/2010 | Nagai et al. .................... | 318/766 |
| 2010/0109583 | A1* | 5/2010 | Maekawa et al. ......... | 318/400.02 |
| 2010/0164416 | A1* | 7/2010 | Yamada .................... | 318/400.13 |
| 2010/0176757 | A1* | 7/2010 | Yamakawa et al. ...... | 318/400.09 |
| 2010/0250067 | A1* | 9/2010 | Matsumura et al. ............ | 701/41 |
| 2011/0005855 | A1* | 1/2011 | Mikamo et al. ............... | 180/443 |
| 2011/0074321 | A1* | 3/2011 | Takai ........................ | 318/400.04 |
| 2013/0169206 | A1* | 7/2013 | Suhama et al. .......... | 318/400.24 |
| 2014/0225540 | A1* | 8/2014 | Omata et al. ............. | 318/400.07 |

FOREIGN PATENT DOCUMENTS

| | | | |
|---|---|---|---|
| JP | 2007-264563 | A | 10/2007 |
| JP | 2011-061910 | A | 3/2011 |
| JP | 2011061910 | A * | 3/2011 |
| WO | WO 2009057841 | A1 * | 5/2009 |

* cited by examiner

*Primary Examiner* — Paul Ip
*Assistant Examiner* — Said Bouziane
(74) *Attorney, Agent, or Firm* — Rennie William Dover

(57) ABSTRACT

A drive-signal-generating circuit includes: a current-detecting unit to detect a current flowing through a three-phase motor; a calculating unit to calculate d- and q-axis currents based on a detection output of the current detecting unit; a reference-signal-output unit to output a reference signal indicating a first-reference value of the q-axis current for rotating the motor at a target-rotational speed; first- and second-control-signal-output units to output first- and second-control signals corresponding to respective errors between current values of the d- and q-axis currents and a second and the first reference values, respectively; a drive-signal-output unit to output such a drive signal that the d- and q-axis currents reach the second and first reference values, respectively; and an adjusting unit to adjust the detection output so that a ripple of the second-control signal become smaller, after a rotational speed of the motor reaches a predetermined rotational speed corresponding to the target-rotational speed.

17 Claims, 10 Drawing Sheets

DRIVE SIGNAL GENERATING CIRCUIT

CROSS-REFERENCE TO RELATED APPLICATION

This application claims the benefit of priority to Japanese Patent Application No. 2011-183558, filed Aug. 25, 2011, of which full contents are incorporated herein by reference.

BACKGROUND OF THE INVENTION

1. Field of the Invention

The present invention relates to a drive signal generating circuit.

2. Description of the Related Art

With respect to a control system of a motor, a vector control system is known that controls a rotor magnetic flux axis component (d-axis current) and a torque component (q-axis current) of a current flowing through the motor (see, e.g., Japanese Laid-Open Patent Publication No. 2011-61910).

In the case of driving the motor using the vector control system, a ripple may be generated in the q-axis current, resulting in an unstable motor rotation. Thus, for example, in Japanese Laid-Open Patent Publication No. 2011-061910, a current to cancel the ripple in the q-axis current is generated by a microcomputer, etc., and is added to the q-axis current to suppress the effect of the ripple. In such a case, since the microcomputer is required to constantly execute complicated arithmetic processing to cancel the ripple, the load of signal processing is increased.

SUMMARY OF THE INVENTION

A drive signal generating circuit according to an aspect of the present invention, includes: a current detecting unit configured to detect a current flowing through a three-phase motor; a calculating unit configured to calculate a d-axis current and a q-axis current based on a detection output of the current detecting unit; a reference signal output unit configured to output a reference signal indicative of a first reference value of the q-axis current for rotating the three-phase motor at a target rotational speed, based on a speed signal indicative of a rotational speed of the three-phase motor and a target signal indicative of the target rotational speed of the three-phase motor; a first control signal output unit configured to output a first control signal corresponding to an error between a current value of the d-axis current and a second reference value; a second control signal output unit configured to output a second control signal corresponding to an error between a current value of the q-axis current and the first reference value; a drive signal output unit configured to output, to a drive circuit configured to drive the three-phase motor, such a drive signal that a current value of the d-axis current becomes equal to the second reference value and a current value of the q-axis current becomes equal to the first reference value, based on the first and the second control signals; and an adjusting unit configured to adjust the detection output based on the second control signal so that a ripple of the second control signal become smaller, after a rotational speed of the three-phase motor reaches a predetermined rotational speed corresponding to the target rotational speed.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
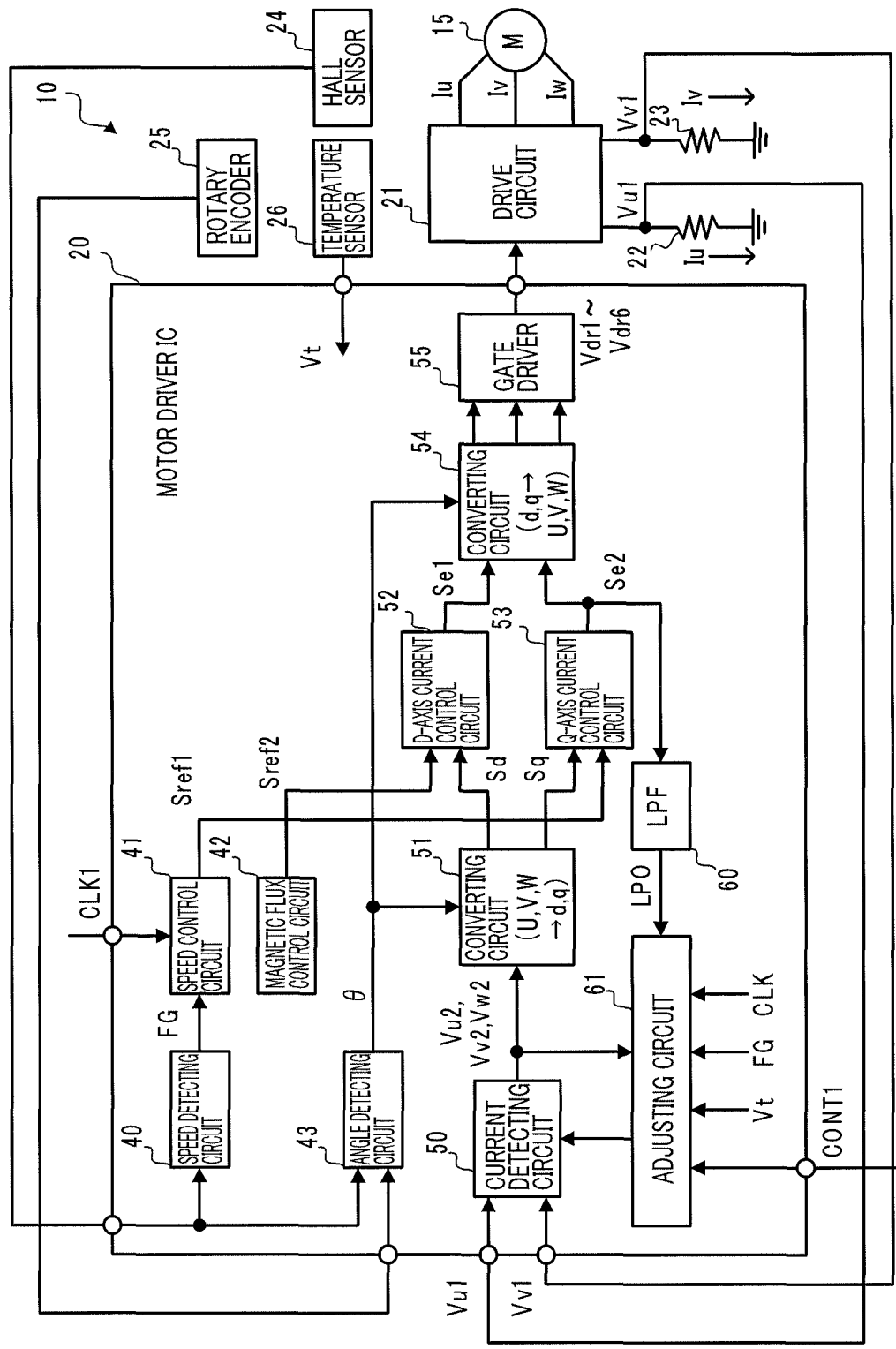
FIG. 1 is a diagram illustrating a configuration of a motor drive circuit 10 according to one embodiment of the present invention.

FIG. 1 depicts a configuration of a motor drive circuit 10 according to one embodiment of the present invention. The motor drive circuit 10 is configured to drive a motor 15 that is a three-phase permanent magnet synchronous motor, and includes a motor driver IC (Integrated Circuit) 20, a drive circuit 21, resistors 22 and 23, a Hall sensor 24, a rotary encoder 25, and a temperature sensor 26.

The motor driver IC 20 (drive signal generating circuit) is configured to output, to the drive circuit 21, drive signals Vdr1 to Vdr6 for causing the motor 15 to reach a target rotational speed, based on an instruction from a microcomputer (not shown), for example.

Figure 2:
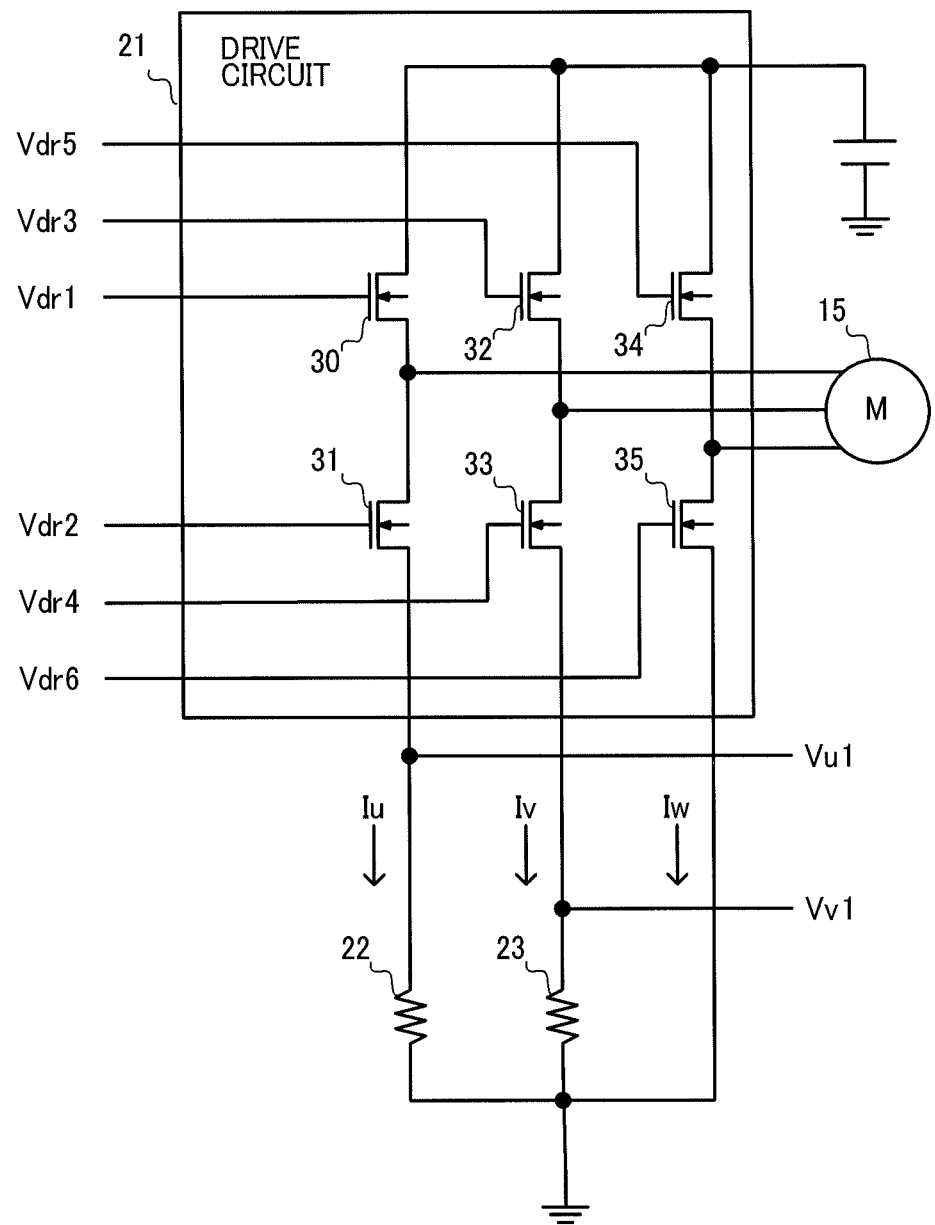
FIG. 2 is a diagram illustrating one example of a drive circuit 21.

The drive circuit 21, as depicted in FIG. 2, includes NMOS transistors 30 to 35 and is configured to drive the motor 15 based on the drive signals Vdr1 to Vdr6.

The resistor 22 is configured to detect a current Iu among three-phase currents Iu, Iv, and Iw, while the resistor 23 is configured to detect the current Iv thereamong.

The Hall censor 24 is configured to output a Hall signal with such a period that changes according to the rotational speed of the motor 15, and the rotary encoder 25 is configured to output a signal indicative of the rotational position of a rotor (not shown) with respect to the motor 15.

The temperature sensor 26 is configured to detect the temperature of the motor driver IC 20 and output a signal Vt corresponding to the detected temperature, for example.

==Details of Motor Driver IC 20==

The motor driver IC 20 includes a speed detecting circuit 40, a speed control circuit 41, a magnetic flux control circuit 42, an angle detecting circuit 43, a current detecting circuit 50, converting circuits 51 and 54, a d-axis current control circuit 52, a q-axis current control circuit 53, a gate driver 55, a low-pass filter (LPF) 60, and an adjusting circuit 61.

The speed detecting circuit 40 is configured to generate an FG signal indicative of the rotational speed of the motor 15, based on the Hall signal outputted from the Hall sensor 24.

The speed control circuit 41 (reference signal output unit) is configured to output a signal Sref1, indicative of a reference value A1 of the q-axis current, for causing the motor 15 to reach the target rotational speed, based on the FG signal and a clock signal CLK1, indicative of the target rotational speed of the motor 15, outputted from a microcomputer (not shown). The magnetic flux control circuit 42 is configured to output a signal Serf2 indicative of a reference value A2 of the d-axis current. Both of the signals Sref1 and Sref2 are digital data.

The angle detecting circuit 43 is configured to output angle data θ indicative of the rotational position of the rotor, based on the signals outputted from the Hall sensor 24 and the rotary encoder 25.

Figure 3:
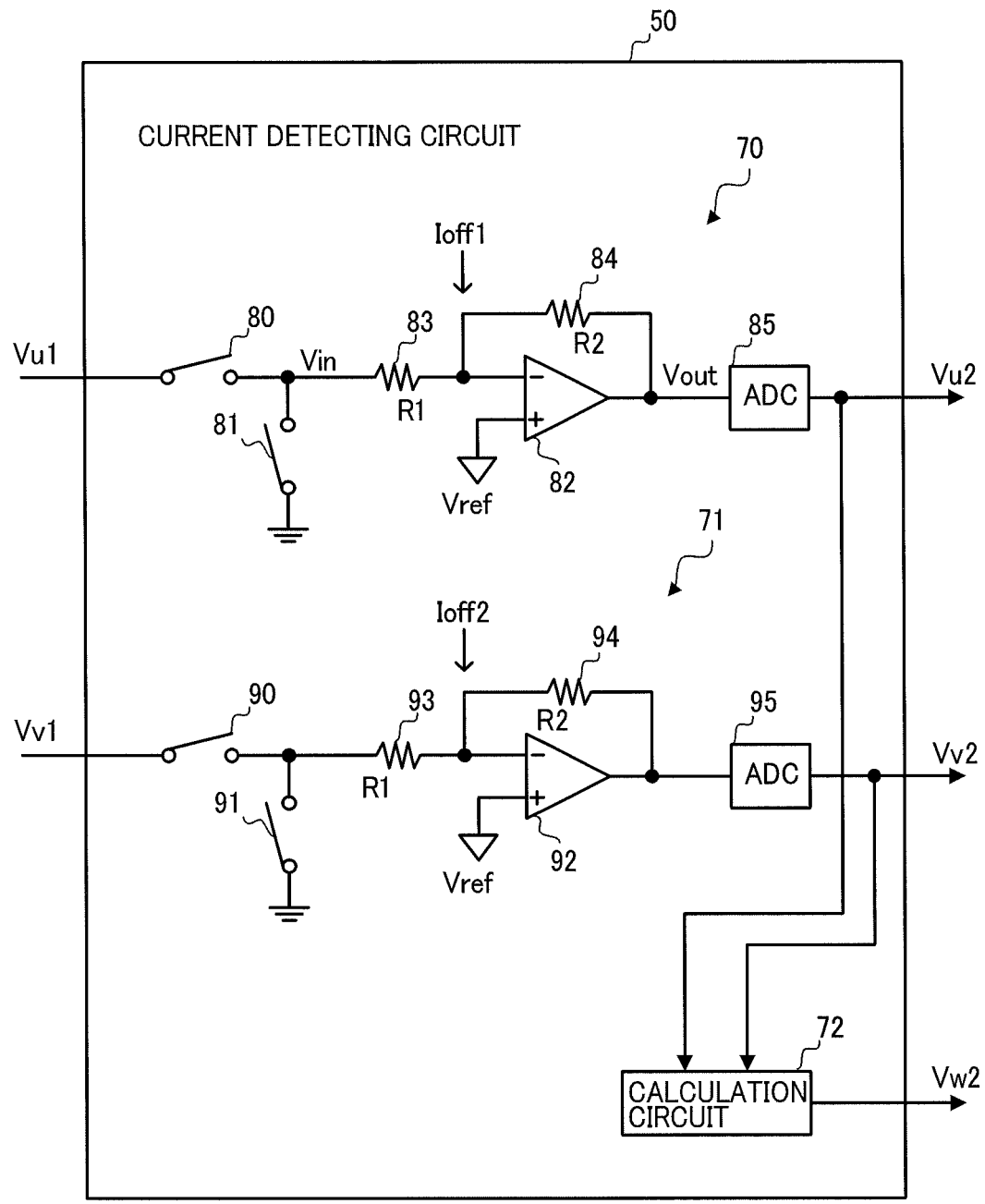
FIG. 3 is a diagram illustrating one example of a current detecting circuit 50.

The current detecting circuit 50 (current detecting unit) is configured to detect the currents Iu and Iv, and outputs voltages Vu2, Vv2, and Vw2 indicative of the three-phase currents Iu, Iv, and Iw, respectively. The current detecting circuit 50 includes a U-phase current detecting circuit 70, a V-phase current detecting circuit 71, and a calculation circuit 72, as depicted in FIG. 3.

The U-phase current detecting circuit 70 is configured to amplify the voltage Vu1 indicative of the current Iu by the predetermined gain and output the amplified voltage, and includes switches 80 and 81, an operational amplifier 82, resistors 83 and 84, and an AD converter (ADC) 85.

One end of the switch 80 (first switch) is applied with the voltage Vu1, and the other end of the switch 80 is connected to the resistor 83. One end of the switch 81 (second switch) is connected to the other end of the switch 80 and the resistor 83, and the other end of the switch 81 is applied with the ground voltage (0 V). Turning on/off of the switches 80 and 81 is controlled based on a signal from the adjusting circuit 61. The switches 80 and 81 are equivalent to a selection circuit, and can be realized by a MOS transistor, etc., for example.

The non-inverting input terminal of the operational amplifier 82 is applied with the predetermined reference voltage Vref (reference voltage) and the inverting input terminal thereof is connected to the resistor 83 (second resistor). The resistor 84 (first resistor) is connected between the inverting input terminal and the output terminal of the operational amplifier 82. Thus, the operational amplifier 82 and the resistors 83 and 84 operate as an inverting amplifier circuit (differential amplifier circuit) configured to invert and amplify the voltage Vu1. The voltage Vout is given by Vout=−(R2/R1)×(Vin−Vref) where the resistance value of the resistor 83 is R1, the resistance value of the resistor 84 is R2, the voltage applied to the resistor 83 is Vin, and the voltage outputted from the operational amplifier 82 is Vout, and the offset of the operational amplifier is ignored. Although details will be described later, in an embodiment of the present invention, in order to adjust the offset of the operational amplifier 82, an adjusting current Ioff1 from the adjusting circuit 61 is supplied to the inverting input terminal. The resistance values R1 and R2 are set at a resistance value sufficiently greater than the on-resistance of the switches 80 and 81 and the resistance value of the resistors 22 and 23. Therefore, in an embodiment of the present invention, the effect of the on-resistance of the switches 80, 81, etc., can be ignored. The non-inverting input terminal of the operational amplifier 82 is applied with such a reference voltage Vref that when the Vin is 0 V, Vout is ½ Vcc (Vcc: source voltage of operational amplifier), for example.

The AD converter 85 is configured to convert the voltage Vout outputted from the operational amplifier 82 into a digital value, and output the converted voltage as the voltage Vu2. As a result, the voltage Vu1 is amplified by the gain determined by the resistors 83 and 84, and is outputted.

The V-phase current detecting circuit 71 is configured to amplify the voltage Vv1 indicative of the current Iv by the predetermined gain and output the amplified voltage, and includes switches 90 and 91, an operational amplifier 92, resistors 93 and 94, and an AD converter (ADC) 95. Since blocks included in the V-phase current detecting circuit 71 is similar to blocks included in the U-phase current detecting circuit 70, detailed description thereof is omitted.

The calculation circuit 72 is configured to calculate the voltage Vw2 indicative of the current Iw, based on the voltage Vu2 indicative of the current Iu and the voltage Vv2 indicative of the current Iv. Specifically, the voltage Vw2 is calculated from an equation Iw=−(Iu+Iv) that holds among the currents Iu, Iv, and Iw, that is, a relational expression of Vw2=−(Vu2+Vv2).

The converting circuit 51 (calculating unit) is configured to convert the three-phase currents Iu to Iw into two-phase currents of the d-axis current and the q-axis current, and calculates a signal Sd indicative of the d-axis current and a signal Sq indicative of q-axis current, based on the voltages Vu2, Vv2, and Vw2 and the angle data θ.

The d-axis current control circuit 52 (first control signal output unit) is configured to output a signal Se1 (first control signal) corresponding to an error between the current value of the d-axis current and the reference value A2, based on the signal Sd indicative of the d-axis current and the signal Sref2 indicative of the reference value A2 of the d-axis current.

The q-axis current control circuit 53 (second control signal output unit) is configured to output a signal Se2 (second control signal) corresponding to an error between the current value of the q-axis current and the reference value A1, based on the signal Sq indicative of the q-axis current and the signal Sref1 indicative of the reference value A1 of the q-axis current. In an embodiment of the present invention, both of the signals Se1 and Se2 are voltage signals.

The converting circuit 54 is configured to convert the two-phase signals Se1 and Se2 into the three-phase (U-phase, V-phase, and W-phase) signals, using the angle data θ.

A gate driver 55 is configured to output such drive signals Vdr1 to Vdr6 that the current value of the d-axis current will reaches the reference value A2 and the current value of the q-axis current reaches the reference value A1, based on the converted three-phase signals. The drive circuit 21 drives the motor 15 based on the drive signals Vdr1 to Vdr6, and thus the rotational speed of the motor 15 results in the target rotational speed. The converting circuit 54 and the gate driver 55 are equivalent to a drive signal output unit.

<<Waveform of Signal Se2>>

Figure 4:
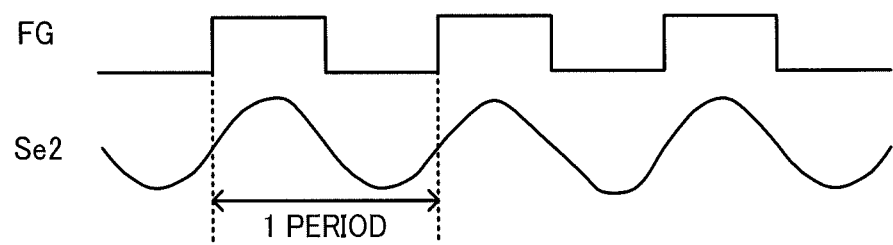
FIG. 4 is a diagram illustrating a waveform of a signal Set when the rotational speed of a motor 15 is constant.
Figure 5:
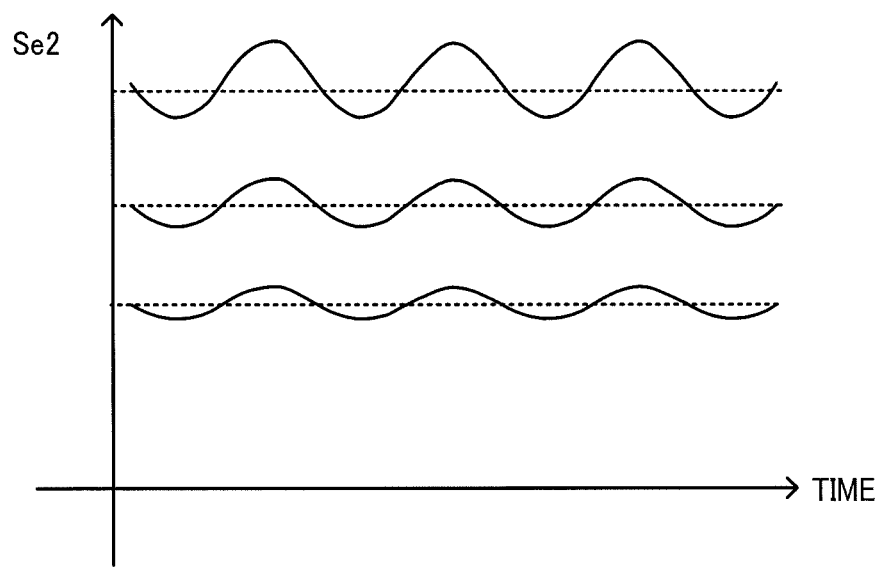
FIG. 5 is a diagram illustrating waveforms of a signal Se2 with respect to different offsets.
Figure 6:
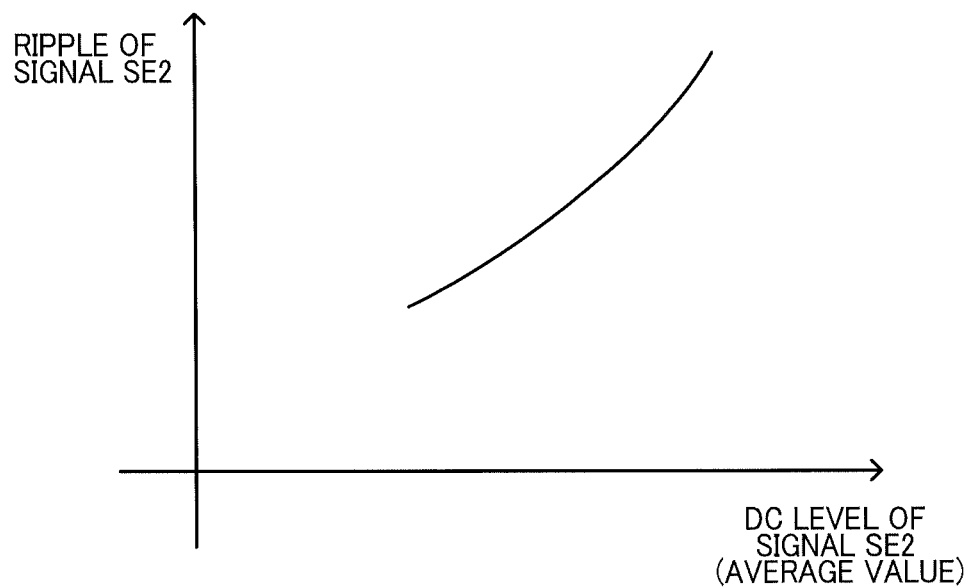
FIG. 6 is a diagram illustrating a relationship of a ripple of a signal Se2 and a DC level of a signal Se2.

A waveform of the signal Se2 will be described when the motor 15 is rotating at the predetermined rotational speed (e.g., target rotational speed). When the motor 15 is rotating at the predetermined rotational speed, the signal Se2 contains a ripple that changes with the period of the FG signal (electrical angle period) as depicted in FIG. 4. FIG. 5 depicts the change in the signal Se2 when the offsets of the operational amplifiers 82 and 92 in the current detecting circuit 50 change. As depicted in FIG. 5, the ripple of the signal Se2 becomes greater as the DC level (average value) of the signal Se2 becomes higher. Namely, such a relationship as depicted in FIG. 6 holds between the DC level of the signal Se2 and the ripple of the signal Se2.

Figure 7:
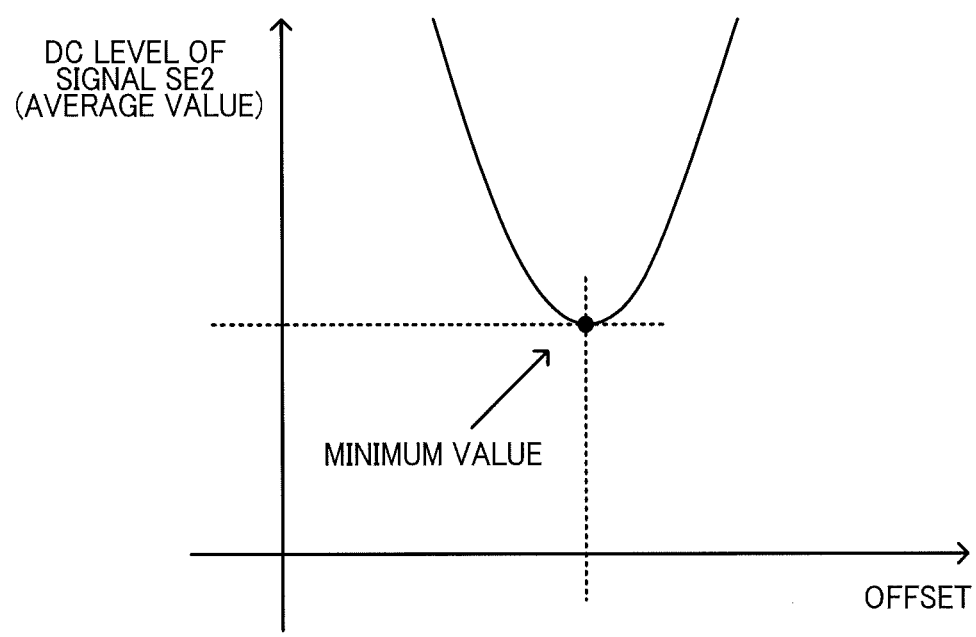
FIG. 7 is a diagram illustrating a relationship between a DC level of a signal Se2 and an offset.
Figure 8:
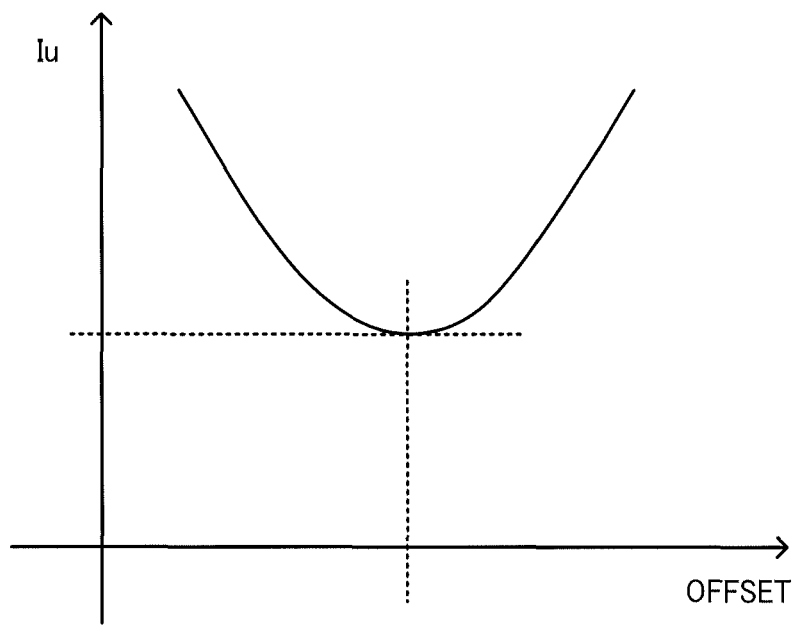
FIG. 8 is a diagram illustrating a relationship between a current Iu and an offset.

FIG. 7 depicts a relationship between the offset and the DC level of the signal Se2 when the offsets of the operational amplifiers 82 and 92 are actually changed. As depicted in FIG. 7, the relationship between the offset and the DC level of the signal Se2 is approximated by a quadratic curve convexed downward. Thus, it becomes possible to minimize the ripple of the signal Se2 by adjusting the offset of the operational amplifiers 82 and 92 so that the DC level of the signal Se2 reaches a minimum in FIG. 7. FIG. 8 depicts a relationship between the current value of the current Iu, for example, and the offset when the motor 15 is rotating at the predetermined rotational speed. As depicted in FIG. 8, the current value of the current Iu changes in the same manner as the DC level of the signal Se2 depicted in FIG. 7. The value of the offset at which the current Iu reaches a minimum is the same as the value at which the DC level of the signal Se2 reaches a minimum. Therefore, if the offset is adjusted so that the ripple of the signal Se2 becomes minimized, consumption current (currents Iu, Iv, and Iw) of the motor 15 will be minimized as well.

<<Major Configuration to Minimize Ripple of Signal Se2>>

The low-pass filter (LPF) 60 and the adjusting circuit 61 will now be described as a major configuration to minimize the ripple of the signal Se2 in the motor drive circuit 10 of FIG. 1.

The low-pass filter 60 is a filter configured to remove the high-frequency noise contained in the signal Se2. The design thereof is made such that the cutoff frequency of the low-pass filter 60 becomes sufficiently higher than the frequency of the ripple so that the ripple of the signal Se2 is not removed.

Figure 9:
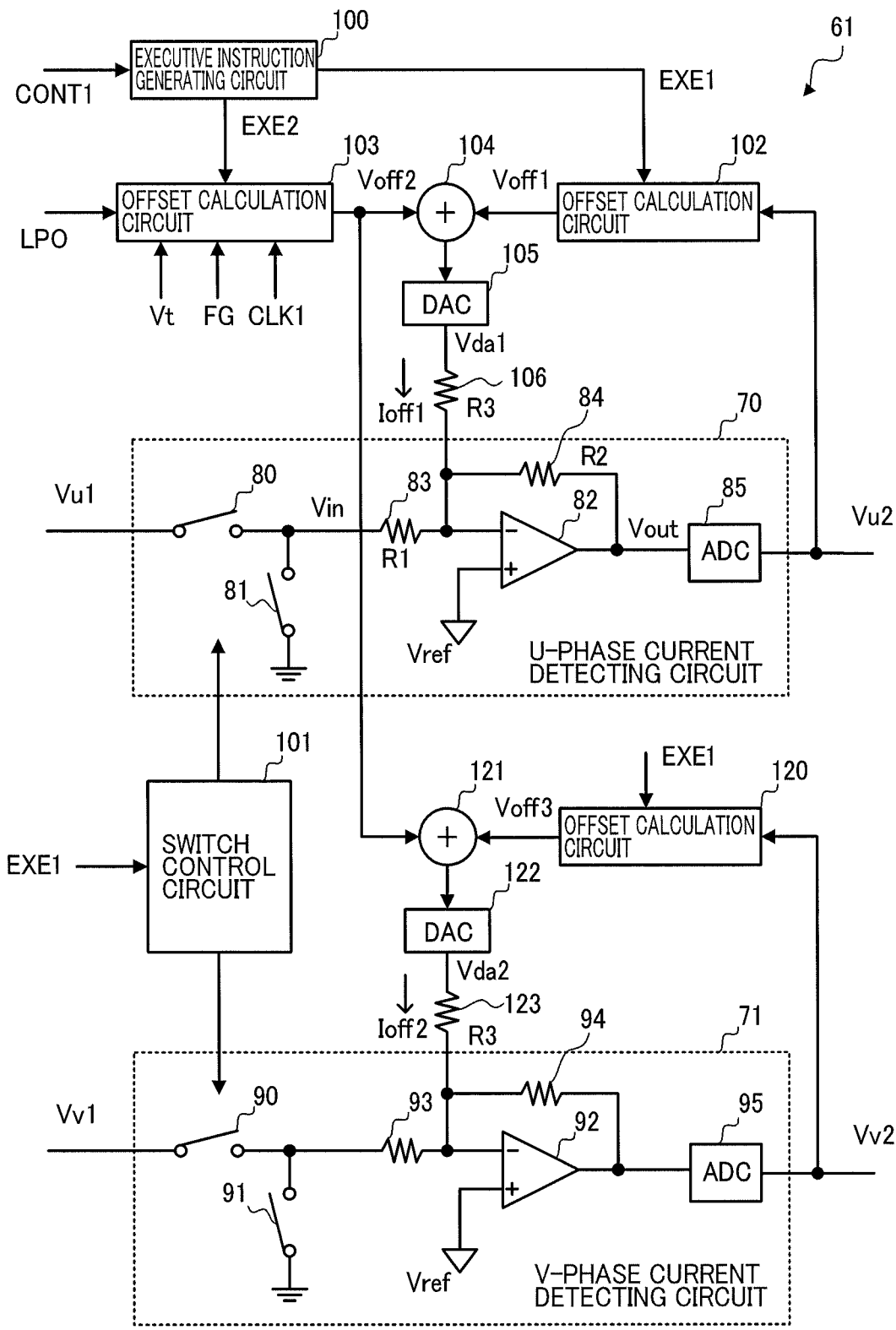
FIG. 9 is a diagram illustrating one example of an adjusting circuit 61.

The adjusting circuit 61 (adjusting unit) is configured to change the offset of the operational amplifiers 82 and 92 to adjust the voltages Vu2 to Vw2 (detection output) from the current detecting circuit 50, and includes an executive instruction generating circuit 100, a switch control circuit 101, offset calculation circuits 102, 103, and 120, adding circuits 104 and 121, DA converters (DACs) 105 and 122, and resistors 106 and 123, as depicted in FIG. 9.

The executive instruction generating circuit 100 is configured to output a signal EXE1 for causing the offset calculation circuits 102 and 120 to be operated or a signal EXE2 for causing the offset calculation circuit 103 to be operated, based on instruction data CONT1 from a higher-order controller. The signals EXE1 and EXE2 are high-level ("H" level) signals, for example.

The switch control circuit 101 is configured to, when the signal EXE1 is outputted thereto, turn off the switches 80 and 90 and turn on the switches 81 and 91 so that the ground voltage is applied to the resistor 83 of the U-phase current detecting circuit 70 and the resistor 93 of the V-phase current detecting circuit 71. Further, the switch control circuit 101 is configured to, for example, when the offset calculation circuit 102 has ended offset calculation processing, turn on the switch 80 and turn off the switch 81. Furthermore, the switch control circuit 101 is configured to, when the offset calculation circuit 120 has ended the offset calculation processing, turn on the switch 90 and turn off the switch 91.

The offset calculation circuit 102 is configured to output an offset value Voff1 to cancel the offset of the operational amplifier 82.

The offset calculation circuit 103 is configured to output an offset value Voff2 to minimize the ripple of the signal Se2.

The adding circuit 104 is configured to add the offset values Voff1 and Voff2 and output the added values, and the DA converter 105 is configured to convert a digital value outputted from the adding circuit 104 into an analog value of a voltage Vda1. One end of the resistor 106 is applied with the voltage Vda1, and the other end thereof is connected to the inverting input terminal of the operational amplifier 82. Thus, the current Ioff1 for adjusting the offset of the operational amplifier 82 is supplied to the inverting input terminal of the operational amplifier 82. The resistance value of the resistor 106 is given as R3.

The operation of the offset calculation circuit 102 will now be described. The offset calculation circuit 102 is configured to output such an offset value Voff1 that causes the voltage Vu2 (=Vout) to become equal to Vref−(R2/R1)×Vin, based on the voltage Vu2. Specifically, since the voltage Vin when the offset calculation circuit 102 is operated is "0", the offset calculation circuit 102 is configured to change the offset value Voff1 so that the voltage Vu2 (=Vout) reaches "Vref". The method of changing the offset value Voff1 so as to cause the voltage Vu2 (=Vout) to become equal to "Vref" (target value) is disclosed in Japanese Laid-Open Patent Publication No. 2007-264563, for example. If the voltage Vu2 (=Vout) reaches "Vref", then the offset calculation circuit 102 stops the calculation processing and continues to output the offset value Voff1 at the time when the voltage Vu2 (=Vout) becomes equal to "Vref".

As such, the offset calculation circuit 102, the adding circuit 104, the DA converter 105, and the resistor 106 operate as an offset adjusting circuit (second offset adjusting unit) to cancel the offset of the operational amplifier 82.

Since the offset calculation circuit 120, the adding circuit 121, the DA converter 122, and the resistor 123 are similar to the offset calculation circuit 102, the adding circuit 104, the DA converter 105, and the resistor 106, detailed description thereof is omitted. If the offset calculation circuits 102 and 120 execute the processing of cancelling the offset, then the current detecting circuit 50 is able to detect the currents Iu to Iw with accuracy.

Figure 10:
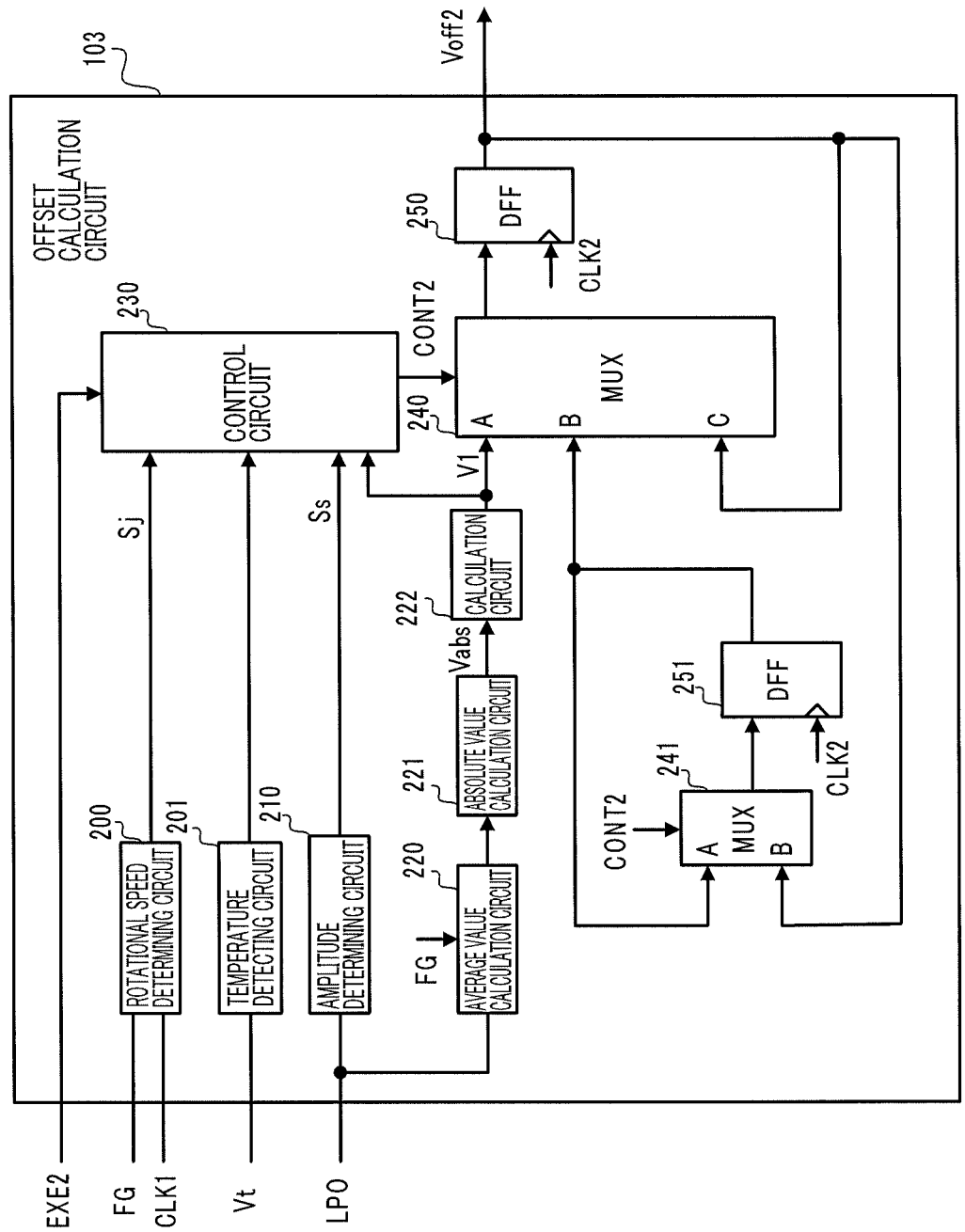
FIG. 10 is a diagram illustrating one example of an offset calculation circuit 103.

Details and operation of the offset calculation circuit 103 will then be described. FIG. 10 depicts one example of the offset calculation circuit 103. The offset calculation circuit 103 includes a rotational speed determining circuit 200, a temperature detecting circuit 201, an amplitude determining circuit 210, an average value calculation circuit 220, an absolute value calculation circuit 221, a calculation circuit 222, a control circuit 230, multiplexers 240 and 241, and D flip-flops 250 and 251.

The rotational speed determining circuit 200 (rotational speed determining unit) determines whether the rotational speed of the motor 15 is within the range of ±5% of the target rotational speed, based on the FG signal and the clock signal CLK1. If the rotational speed of the motor 15 is within the range of ±5% of the target rotational speed, then the rotational speed determining circuit 200 outputs a high-level signal Sj. Therefore, when it is determined that the rotational speed of the motor 15 is increased and has reached the predetermined rotational speed lower by 5% than the target rotational speed, for example, then the rotational speed determining circuit 200 outputs the high-level signal Sj.

The temperature detecting circuit 201 (temperature detecting unit) is configured to acquire a signal Vt corresponding to the temperature every predetermined period, and output a high-level pulse signal when the temperature change is equal to or greater than the predetermined temperature.

The amplitude determining circuit 210 (amplitude determining unit) is configured to detect the amplitude of a signal LPO outputted from the low-pass filter 60, namely, the signal Se2 with the high-frequency noise removed therefrom, and determine whether the amplitude is equal to or greater than the predetermined amplitude. If the detected amplitude is equal to or greater than the predetermined amplitude, then the amplitude determining circuit 210 outputs a stop signal Ss to stop the offset calculation processing.

The average value calculation circuit 220 (calculating unit) is configured to calculate the average value of the signal LPO (signal Se2) in a time period equal to the integral multiple period of the period of the FG signal. The calculated average value corresponds to the DC level of the signal Se2. The absolute value calculation circuit 221 calculates an absolute value Vabs of the calculated average value.

The calculation circuit 222 is configured to change an offset value V1 so that the calculated absolute value Vabs reaches a minimum, and output the changed value. As depicted in FIG. 7, in an embodiment of the present invention, such a point exists that the DC level of the signal Se2, i.e., the absolute value Vabs, reaches a minimum when the offset is changed. Thus, the calculation circuit 222 changes the offset value V1 by executing a combination of the method disclosed in Japanese Laid-Open Patent Publication No. 2007-264563 and the algorithm of the steepest descent method, etc., for example.

The control circuit 230 is configured to output a two-bit signal CONT2 for controlling the multiplexers 240 and 241, based on the execution signal EXE2, the stop signal Ss, the signal Sj outputted from the rotational speed determining circuit 200, the output of the temperature detecting circuit 201, and the offset value V1. Specifically, the control circuit 230 causes the offset calculation circuit 103 to execute the offset adjusting processing if the rotational speed of the motor 15 falls within the predetermined speed range (e.g., target rotational speed ±5%) when an offset adjusting instruction is outputted from the higher-order controller or when the output of the temperature detecting circuit 201 is high due to the temperature change. That is, the control circuit 230 is configured to output the ("H", "H") signal CONT2 indicative of the execution mode, if the signal Sj goes high while the execution signal EXE2 is inputted thereto or if the signal Sj goes high while the output of the temperature detecting circuit 201 is high.

The control circuit 230 is configured to output the ("L", "H") signal CONT2 indicative of the idle mode when the offset value V1 converges, that is, when the absolute value Vabs reaches a minimum.

Further, the control circuit 230 is configured to stop the offset adjusting processing when the amplitude of the signal Set becomes equal to or greater than the predetermined amplitude, or when the rotational speed of the motor 15 gets out of the predetermined speed range during the execution mode. Specifically, the control circuit 230 is configured to output the ("H", "L") signal CONT2 indicative of the stop mode when the stop signal Ss goes high or when the signal Sj goes low during the execution mode. It should be noted that a design is made such that the control circuit 230 gives priority to the stop signal Ss irrespective of the logic level of other signals. That is, even if the execution signal EXE2 or the high-level output of the temperature detecting circuit 201 is inputted to the control circuit 230, when the high-level stop signal Ss is inputted, priority is given to the stop signal Ss. For example, when the stop signal Ss is changed from high to low, the control circuit 230 outputs the signal CONT2 indicative of the idle mode.

The multiplexer 240 is configured to select and output an A input signal in the case of the execution mode, a C input signal in the case of the idle mode, and a B input signal in the case of the stop mode.

The multiplexer 241 is configured to select and output the A input signal in the case of the execution mode and the stop mode, and the B input signal in the case of the idle mode.

The D flip-flops 250 and 251 is configured to output a signal to be inputted in synchronization with a clock signal CLK2.

Therefore, when the operation mode of the offset calculation circuit 103 is the execution mode, such an offset value V1 that the absolute value Vabs reaches a minimum is outputted as the offset value Voff2. When the operation mode of the offset calculation circuit 103 is the idle mode, the offset value Voff2 outputted from the D flip-flop 250 is inputted to the D flip-flop 250 via the multiplexer 240. Thus, in this case, the offset value Voff2 before the mode is changed to the idle mode continues to be outputted.

When the operation mode of the offset calculation circuit 103 is the stop mode, the D flip-flop 251 continues to output the offset value Voff2 inputted to the multiplexer 241 before the mode is changed to the stop mode (offset value Voff2 at the time of the idle mode). Thus, the offset value Voff2 in the idle mode before being changed to the stop mode is outputted from the D flip-flop 250.

The offset value Voff2 outputted from such an offset calculation circuit 103 is outputted to the DA converter 105 via the adding circuit 104. Thus, the offset current Ioff1 corresponding to the offset value Voff2 is supplied from the DA converter 105. As such, the offset calculation circuit 103, the adding circuit 104, the DA converter 105, and the resistor 106 operate as an offset adjusting circuit (first offset adjusting unit) to suppress the ripple. Since the offset value Voff2 is supplied to both of the adding circuits 104 and 121, the offset calculation circuit 103, the adding circuit 121, the DA converter 122, and the resistor 123 as well operate as the offset adjusting circuit (first offset adjusting unit) to suppress the ripple.

The configuration may be such that the offset value to be supplied to the adding circuit 121 is independent of the Voff2. In this case, an independent circuit corresponding to the offset calculation circuit 103 is configured.

==Operation of Motor Drive Circuit 10==

Figure 11:
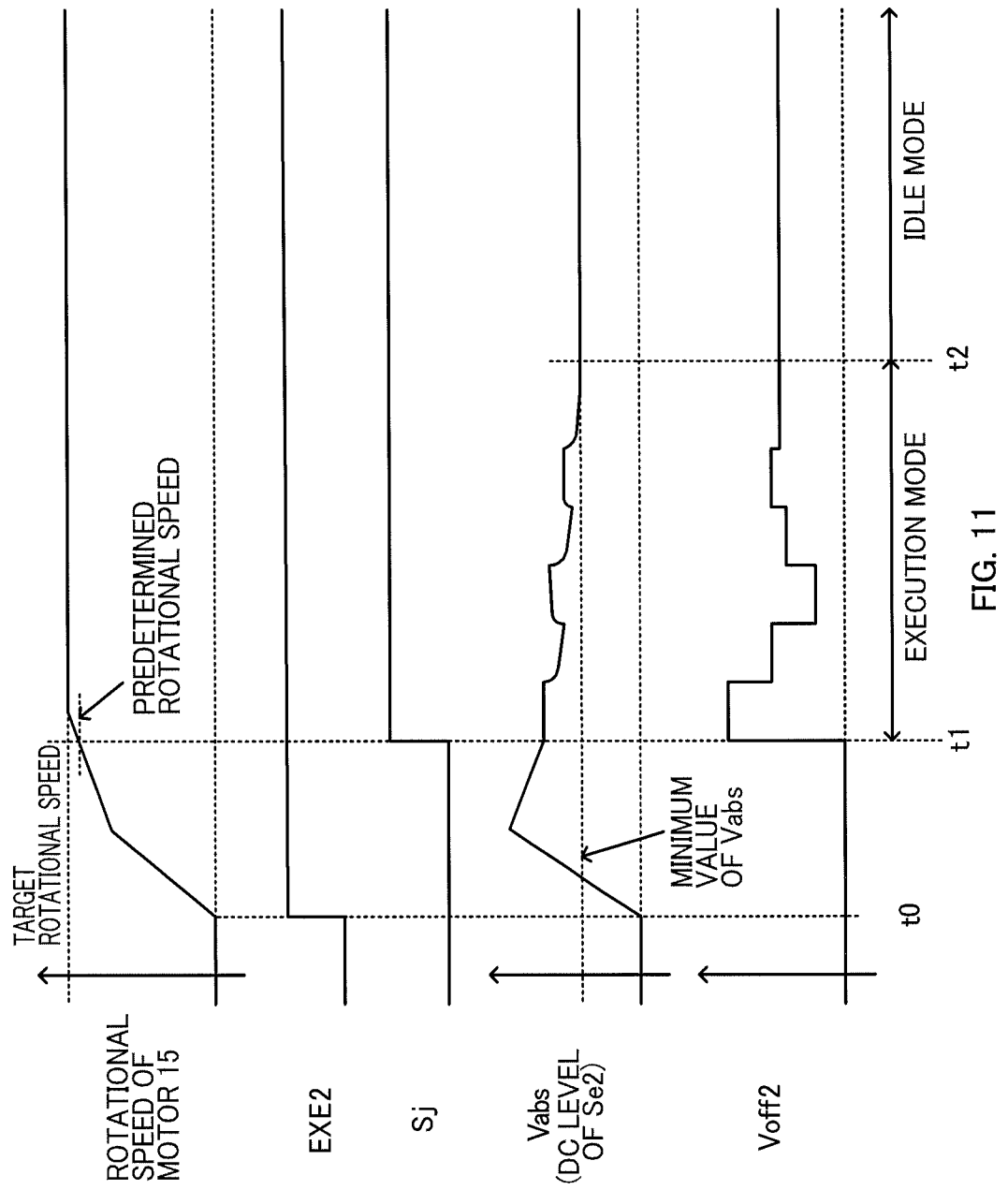
FIG. 11 is a diagram for describing an operation of a motor drive circuit 10.

The operation of the motor drive circuit 10 will be described with reference to FIG. 11. It is assumed here that, before time t0 at which the motor 15 starts to rotate, the offset calculation circuits 102 and 120 operate and the offset of the current detecting circuit 50 (offset of operational amplifiers 82 and 92) is cancelled. It is assumed here that based upon the instruction from the higher-order controller (not shown), the execution signal EXE2 goes high at time t0, for example.

When the motor 15 starts to rotate at time t0, the rotational speed of the motor 15 gradually increases and reaches the predetermined rotational speed (e.g., 95% of target rotational speed) at time t1. At time t1, the signal Sj outputted from the rotational speed determining circuit 200 goes high. Since both of the execution signal EXE2 and the signal Sj are high, the offset adjusting circuit 103 goes to the execution mode for minimizing the absolute value Vabs. For example, at time t2, when the absolute value Vabs reaches a minimum value and the offset value Voff2 converges, the offset adjusting circuit 103 goes to the idle mode, thereby maintaining the offset value Voff2 at time t2 when the absolute value Vabs reaches the minimum value.

Figure 12:
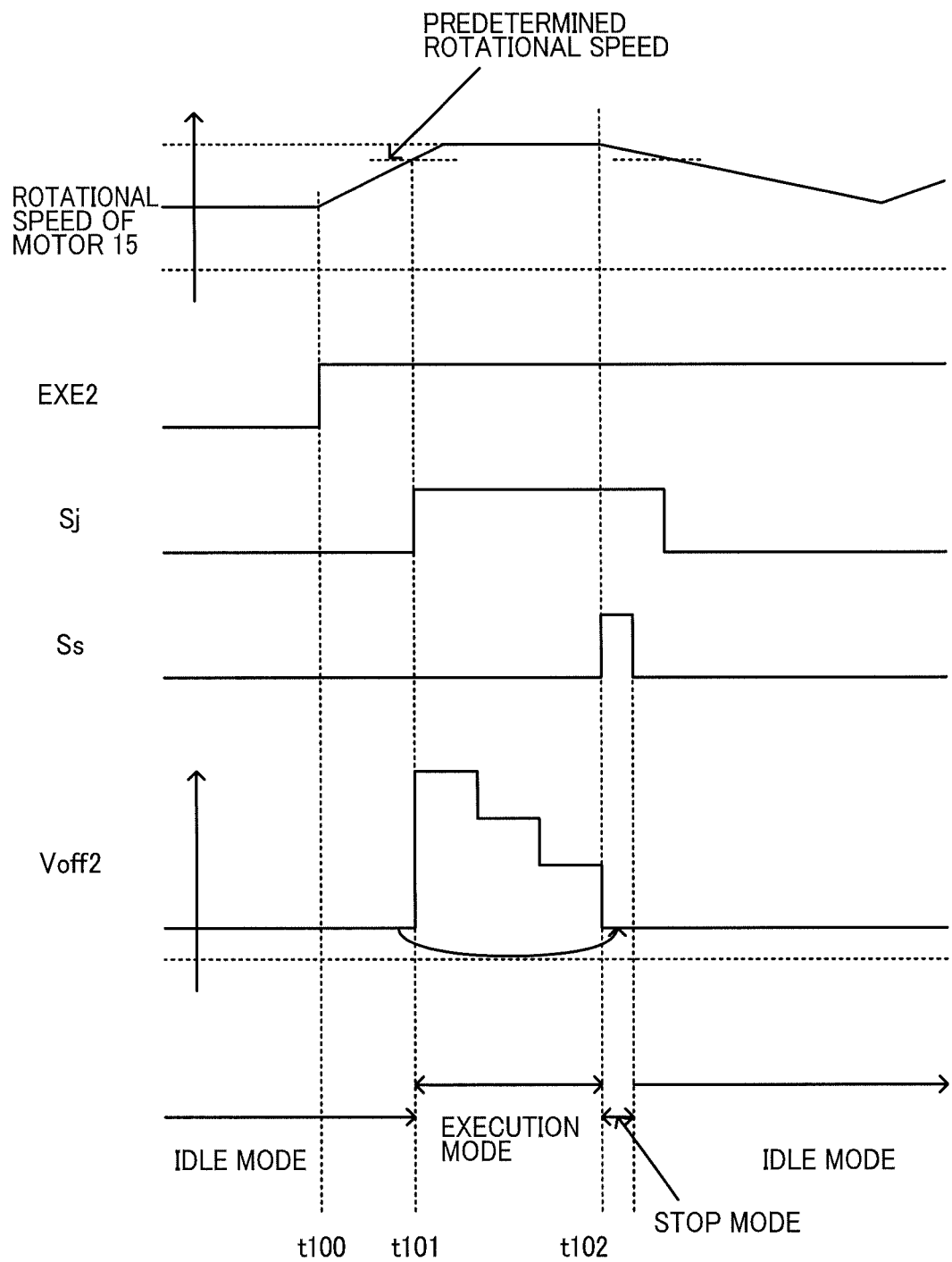
FIG. 12 is a diagram for describing an operation of a motor drive circuit 10 when a load of a motor 15 abruptly changes.

FIG. 12 depicts one example of major waveforms of the motor drive circuit 10 when the target rotational speed of the motor 15 is changed and thereafter the load of the motor 15 abruptly changes. It is assumed here that the execution signal EXE2 goes high at time 100, for example, based on the instruction from the higher-order controller (not shown).

For example, when the target rotational speed is changed to a higher speed at time t100, the rotational speed of the motor 15 gradually increases and reaches the predetermined rotational speed (e.g., 95% of target rotational speed after being changed) at time t101. Thus, at time t101, the signal Sj outputted from the rotational speed determining circuit 200 goes high. When the signal Sj going high, the execution signal EXE2 is high as well as described above, the offset adjusting circuit 103 starts the execution mode for minimizing the absolute value Vabs.

If, at time t102 before the offset value Voff2 has converged, the motor 15 is put under heavy load, the rotational speed of the motor 15 abruptly drops. At this moment, since the signal LPO (signal Se2) greatly changes and the amplitude of the signal LPO becomes greater than the predetermined amplitude, for example, the stop signal Ss goes high. As a result, in the offset adjusting circuit 103, the stop mode is executed and the offset value Voff2 at the time of the idle mode immediately before time t101 is outputted. Thereafter, for example, until the rotational speed of the motor 15 reaches the predetermined rotational speed again, the value of the offset value Voff2 is maintained.

Although FIG. 12 has described one example where the stop signal Ss goes high thereby executing the stop mode, the stop mode is executed when the rotational speed of the motor 15 abruptly drops, even if the stop signal Ss does not go high. Specifically, when the rotational speed of the motor 15 abruptly drops and becomes lower than the predetermined rotational speed (e.g., 95% of target rotational speed after being changed), the signal Sj goes low. As a result, the offset adjusting circuit 103 executes the stop mode and outputs the offset value Voff2 at the time of the idle mode immediately before time t101.

Hereinabove, a description has been given of the motor drive circuit 10 according to an embodiment of the present invention. In the motor drive circuit 10, when the voltages Vu to Vw2 of the current detecting circuit 50 change, the ripple of the signal Se2 also changes. In an embodiment of the present invention, since the voltages Vu2 to Vw2, which are parameters of the ripple of the signal Se2, are directly adjusted based on the signal Se2, there is no necessity of sequentially calculating a signal to cancel the ripple of the signal Se2, for example. Thus, in an embodiment of the present invention, the rotation of the motor 15 can be stabilized with the processing load of the motor driver IC 20 being suppressed.

In suppressing the ripple of the signal Se2, the offset of the voltages Vu2 to Vw2 outputted from the current detecting circuit 50 may be directly adjusted. However, adjusting the offset of the operational amplifiers 82 and 92 as in an embodiment of the present invention can realize the offset adjustment with the dynamic range of the operational amplifiers made more effective.

It is also possible, for example, to detect the ripple of the signal Se2 and adjust the offset so that the magnitude of the ripple is reduced. However, since the signal Se2 generally contains the noise besides the ripple, the noise can erroneously be detected as the ripple. In an embodiment of the present invention, since the offset is adjusted based on the DC level of the signal Se2, the ripple can be suppressed with accuracy.

The ripple of the signal Se2 changes with the period of the FG signal. Thus, if the DC level is set at an average value for a time period equal to the integral multiple period of the period of the FG signal, the DC level of the signal Se2 can be calculated with accuracy even if the time period is short.

As described in FIG. 12, for example, when the state of load of the motor 15 abruptly changes, the amplitude of the signal Se2 may increase. In such a case, continuing adjusting the offset in such a case can possibly destabilize the rotation of the motor 15. In an embodiment of the present invention, when the amplitude of the signal Se2 becomes great, the adjustment of the offset is stopped. Thus, the destabilized rotation of the motor 15 can be prevented.

Continuing adjusting the offset in a state where the rotation of the motor 15 is out of the substantially constant rotation (within a range of ±5% of target rotational speed, for example) can destabilize the rotation of the motor 15. In an embodiment of the present invention, when the rotation of the motor 15 becomes lower than the predetermined rotational speed (e.g., 95% of target rotational speed after being changed) during the execution of the offset adjustment, the adjustment of the offset is stopped, and thus the motor 15 can be rotated stably.

Even when the offset is adjusted once so as to make the ripple small, if the temperature changes, the offset changes, thereby making the ripple large. Even in such a case, in an embodiment of the present invention, when the change in the temperature for each predetermined time period becomes greater than the predetermined value, the offset adjustment is executed again to minimize the ripple. Thus, even if the temperature changes, the rotation of the motor 15 can be stabilized.

In the motor driver IC 20, before the execution of the offset adjustment to minimize the ripple, the offset of the current detecting circuit 50 itself is cancelled. Thus, the accuracy of the current detection in the current detecting circuit 50 can be improved.

In an embodiment of the present invention, since the resistance values of the resistors 83 and 84 are sufficiently greater than the on-resistance of the switches 80, 81, etc., the effect of the on-resistance of the switches 80, 81, etc., can be ignored in the current detecting circuit 50.

While the rotational speed determining circuit 200 determines whether or not the rotational speed of the motor 15 has reached the predetermined rotational speed (e.g., 95% of the target rotational speed), the rotational speed determining circuit 200 may determine whether or not the rotational speed of the motor 15 has reached the target rotational speed. Even in such a case, the effects similar to those of an embodiment of the present invention can be obtained.

While the motor driver IC 20 is realized by so-called hardware, similar functions may be realized by software, using a microcomputer, etc.

Although, in FIG. 12, a description has been given of the case where the rotational speed of the motor 15 abruptly drops, the same processing (stop mode, idle mode) as in FIG. 12 is executed when the state of load changes thereby abruptly raising the rotational speed of the motor 15. Specifically, for example, when the rotational speed of the motor 15 abruptly rises and the stop signal Ss goes high, the stop mode is executed. Even if the stop signal Ss does not go high, when the rotational speed of the motor 15 exceeds the predetermined rotational speed 5% higher than the target rotational speed, the signal Sj goes low and the stop mode is executed.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A drive signal generating circuit, comprising:
a current detecting unit configured to detect a current flowing through a three-phase motor, wherein the current detecting unit includes:
   a differential amplifier circuit configured to amplify, by a predetermined gain, a difference between a voltage corresponding to a current flowing through the three-phase motor and a reference voltage, and output the amplified difference as the detection output, wherein the current detecting unit includes a selection circuit configured to select and output a predetermined voltage or a voltage corresponding to a current flowing through the three-phase motor, wherein
the differential amplifier circuit is configured to amplify, by the predetermined gain, a difference between a voltage outputted from the selection circuit and the reference voltage, and output the amplified difference as the detection output;
a calculating unit configured to calculate a d-axis current and a q-axis current based on a detection output of the current detecting unit;
a reference signal output unit configured to output a first reference signal indicative of a first reference value of the q-axis current for rotating the three-phase motor at a target rotational speed, based on a speed signal indicative of a rotational speed of the three-phase motor and a clock signal indicative of the target rotational speed of the three-phase motor;
a magnetic flux control circuit configured to output a second reference signal indicative of a reference value of the d-axis current;
an angle detecting circuit configured to generate a signal indicative of the rotational speed of the motor based on a Hall signal outputted from a Hall sensor;
a first control signal output unit configured to output a first control signal corresponding to an error between a current value of the d-axis current and the second reference value;
a second control signal output unit configured to output a second control signal corresponding to an error between a current value of the q-axis current and the first reference value;
a drive signal output unit configured to output, to a drive circuit configured to drive the three-phase motor, such a drive signal that a current value of the d-axis current becomes equal to the second reference value and a current value of the q-axis current becomes equal to the first reference value, based on the first and the second control signals; and
an adjusting unit configured to adjust the detection output based on the second control signal so that a ripple of the second control signal becomes smaller, after a rotational speed of the three-phase motor reaches a predetermined rotational speed corresponding to the target rotational speed, wherein
the adjusting unit includes:
a rotational speed determining unit configured to determine whether or not a rotational speed of the three-phase motor has reached the predetermined rotational speed;
a first offset adjusting unit configured to, when it is determined that a rotational speed of the three-phase motor has reached the predetermined rotational speed, adjust an offset of the differential amplifier circuit so that a ripple of the second control signal becomes smaller, wherein
the first offset adjusting unit is configured to adjust an offset of the differential amplifier circuit, after an offset of the differential amplifier circuit is adjusted by the second offset adjusting unit and a voltage corresponding to a current flowing through the three-phase motor is outputted from the selection circuit;
a second offset adjusting unit configured to, when the predetermined voltage is outputted from the selection circuit, adjust an offset of the differential amplifier circuit so that the detection output becomes equal in value to a voltage determined by a product of the gain and a difference between the predetermined voltage and the reference voltage, and
a control unit configured to, when an offset of the differential amplifier circuit has been adjusted by the second offset adjusting unit, control the selection circuit so that a voltage corresponding to a current flowing through the three-phase motor is outputted from the selection circuit.

2. The drive signal generating circuit of claim 1, wherein the adjusting unit further includes:
a calculating unit configured to calculate a DC level of the second control signal, and wherein
the first offset adjusting unit is configured to adjust an offset of the differential amplifier circuit so that the DC level of the second control signal becomes smaller, based on the DC level of the second control signal.

3. The drive signal generating circuit of claim 2, wherein the calculating unit is configured to calculate, as the DC level, an average value of the second control signal in a time period equal to an integral multiple period of a period of the speed signal.

4. The drive signal generating circuit of claim 1, wherein the adjusting unit further includes an amplitude determining unit configured to determine whether or not an amplitude of the second control signal is greater than a predetermined amplitude, and wherein
the first offset adjusting unit is configured to stop adjusting an offset of the differential amplifier circuit when it is determined that an amplitude of the second control signal is greater than the predetermined amplitude.

5. The drive signal generating circuit of claim 1, wherein the first offset adjusting unit is configured to stop adjusting an offset of the differential amplifier circuit, when it is determined that a rotational speed of the three-phase motor is lower than the predetermined rotational speed, while adjusting an offset of the differential amplifier circuit.

6. The drive signal generating circuit of claim 1, wherein the adjusting unit further includes a temperature detecting unit configured to detect a temperature in each predetermined period, and wherein
the first offset adjusting unit is configured to adjust an offset of the differential amplifier circuit when a change in temperature detected in each predetermined period becomes greater than a predetermined value.

7. The drive signal generating circuit of claim 1, wherein the selection circuit includes
a first switch having one end applied with a voltage corresponding to a current flowing through the three-phase motor, and
a second switch having one end applied with the predetermined voltage and another end connected to an other end of the first switch, the second switch configured to be turned on/off in a complementary manner to the first switch, wherein the differential amplifier circuit includes:
an operational amplifier having a non-inverting input terminal applied with the reference voltage;
a first resistor having one end connected to an inverting input terminal of the operational amplifier and another end connected to an output terminal of the operational amplifier; and
a second resistor having one end connected to an other end of the first switch and another end connected to the inverting input terminal of the operational amplifier, and wherein
the resistance values of the first and the second resistors are greater than on-resistances of the first and the second switches.

8. A drive signal generating circuit, comprising:
a current detecting circuit having a first input, a second input, and an output, the current detecting circuit configured to detect a current flowing through a three-phase motor, wherein the current detecting circuit includes a differential amplifier circuit configured to amplify, by a predetermined gain, a difference between a voltage corresponding to a current flowing through the three-phase motor and a reference voltage, and output the amplified difference as the detection output, wherein the current detecting circuit includes a selection circuit configured to select and output a predetermined voltage or a voltage corresponding to a current flowing through the three-phase motor, wherein the differential amplifier circuit is configured to amplify, by the predetermined gain, a difference between a voltage outputted from the selection circuit and the reference voltage, and output the amplified difference as the detection output;
a first converting circuit having a first input, a second input, a first output, and a second output, the first converting circuit configured to convert three phase currents into two phase currents;
a first control signal output unit having a first input, a second input, and an output, the first input of the first control signal output unit coupled to the first output of the first converting circuit;
a second control signal output unit having a first input, a second input, and an output, the first input of the second control signal output unit coupled to the second output of the first converting circuit;
a speed control circuit having a first input, a second input, and an output, the first input coupled for receiving a clock signal and the output coupled to the second input of the second control circuit, the speed control circuit configured to output a first reference signal indicative of a first reference value of the q-axis current for rotating the three-phase motor at a target rotational speed, based on a speed signal indicative of a rotational speed of the three-phase motor and a clock signal indicative of the target rotational speed of the three-phase motor;
a magnetic flux control circuit having an output coupled to the second input of the second current control signal output unit and configured to output a second reference signal indicative of a reference value of the d-axis current;
an angle detecting circuit having a first input, a second input, and an output, the first input of the angle detecting circuit coupled to the input of the speed detecting circuit and the output of the angle detecting circuit coupled to the second input of the first converting circuit and to the third input of the second converting circuit, the angle detecting circuit configured to generate a signal indicative of the rotational speed of the motor based on a Hall signal outputted from a Hall sensor; and
a second converting circuit having a first input, a second input, a third input, and a plurality of outputs, the first input of the second converting circuit coupled to the output of the first control circuit and the second input of the second converting circuit coupled to the output of the second control circuit.

9. The drive signal generating circuit of claim 8, further including a speed detecting circuit having an input and an output, the speed detecting circuit configured to generate an output signal indicative of a rotational speed of a motor.

10. The drive signal generating circuit of claim 8, further including an adjusting circuit having a plurality of inputs and an output, the output of the adjusting circuit coupled to the third input of the current detecting circuit and a first input of the plurality of inputs coupled to the output of the current detecting circuit.

11. The drive signal generating circuit of claim 10, further including a low pass filter having an input and an output, the input of the low pass filter coupled to the output of the second control circuit and the output of the low pass filter coupled to a second input of the plurality of inputs of the adjusting circuit.

12. A drive signal generating circuit, comprising:
a current detecting circuit having a first input, a second input, and an output, wherein the current detecting circuit comprises:
a calculation circuit having a first input, a second input, and an output, the calculation circuit configured to determine a first voltage indicative of a first current in response to a second voltage and a third voltage, wherein the second voltage is indicative of a second current and the third voltage is indicative of a third current, wherein the first current, the second current, and the third current serve as drive currents for a three phase motor;
a first operational amplifier having an inverting input, a noninverting input, and an output, the inverting input coupled to the output through a first resistor and to the first input of the current detecting circuit through a second resistor and a first switching network;
a first analog to digital converter having an input and an output, the input of the first analog to digital converter coupled to the output of the first operational amplifier and to the first input of the calculation circuit;
a second operational amplifier having an inverting input, a noninverting input, and an output, the inverting input coupled to the output through a third resistor and to the input of the second current detecting circuit through a fourth resistor and a second switching network; and
a second analog to digital converter having an input and an output, the input of the second analog to digital converter coupled to the output of the second operational amplifier and to the second input of the calculation circuit;
a first converting circuit having a first input, a second input, a first output, and a second output, the first converting circuit configured to convert three phase currents into two phase currents;
a first control signal output unit having a first input, a second input, and an output, the first input of the first control signal output unit coupled to the first output of the first converting circuit;
a second control signal output unit having a first input, a second input, and an output, the first input of the second control signal output unit coupled to the second output of the first converting circuit;

a speed control circuit having a first input, a second input, and an output, the first input coupled for receiving a clock signal and the output coupled to the second input of the second control circuit;

a magnetic flux control circuit having an output coupled to the second input of the second current control signal output unit; and a second converting circuit having a first input, a second input, a third input, and a plurality of outputs, the first input of the second converting circuit coupled to the output of the first control circuit and the second input of the second converting circuit coupled to the output of the second control circuit.

13. The drive signal generating circuit of claim 12, wherein the adjusting circuit comprises:

a first adder having a first input, a second input, and an output;

a first offset calculation circuit having a plurality of inputs and an output, the output of the first offset calculation circuit coupled to the first input of the first adder;

a second offset calculation circuit having a first input, a second input, and an output, the first input coupled to the output of the first analog to digital circuit, and the output of the second offset calculation circuit coupled to the second input of the first adder; and a first digital to analog converter having an input and an output, the input of the first digital to analog converter coupled to the output of the adder and the output of the first digital to analog converter coupled to the inverting input of the first operational amplifier.

14. The drive signal generating circuit of claim 13, wherein the adjusting circuit further comprises:

a second adder having a first input, a second input, and an output, the first input of the second adder coupled to the first input of the first adder;

a third offset calculation circuit having a plurality of inputs and an output, the output of the third offset calculation circuit coupled to the second input of the second adder; and a second digital to analog converter having an input and an output, the input of the second digital to analog converter coupled to the output of the second adder and the output of the first digital to analog converter coupled to the inverting input of the second operational amplifier.

15. The drive signal generating circuit of claim 14, wherein the adjusting circuit further comprises a switch control circuit having an input, a first output, and a second output, the first output coupled to the first switching network and the second output coupled to the second switching network.

16. A method for generating a drive signal for a three-phase motor, comprising:

generating a current detection signal in response to a first drive current and a second drive current;

converting the current detection signal from a three phase current signal to a two phase current signal comprising a d-axis current and a q-axis current;

generating a q-axis reference signal indicative of a first reference value of the q-axis current for rotating the three-phase motor at a target rotational speed, based on a speed signal indicative of a rotational speed of the three-phase motor and a clock signal indicative of the target rotational speed of the three-phase motor;

generating a d-axis reference signal indicative of a reference value of the d-axis current;

generating a rotational speed indicator signal in response to a Hall signal;

generating a d-axis current control signal in response to the rotational speed indicator signal and an error between the d-axis current and the d-axis reference current signal;

generating a q-axis control signal in response to the rotational speed indicator signal and an error signal between the q-axis current and the q-axis reference current signal;

converting the d-axis control signal and the q-axis control signal into a three phase signal;

generating an adjustment signal in response to the q-axis control signal and using the adjustment signal to change an offset of a first operational amplifier; and inputting the three phase signals into a gate driver.

17. The method of claim 16, further including using the adjustment signal to change an offset of a second operational amplifier.

* * * * *